United States Patent
Kaminade et al.

(10) Patent No.: US 10,399,522 B2
(45) Date of Patent: Sep. 3, 2019

(54) MOUNTING STRUCTURE OF VEHICLE PERIPHERY MONITORING DEVICE

(71) Applicant: TOYOTA JIDOSHA KABUSHIKI KAISHA, Toyota-shi, Aichi-ken (JP)

(72) Inventors: Takuya Kaminade, Okazaki (JP); Koji Takeuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 15/832,842

(22) Filed: Dec. 6, 2017

(65) Prior Publication Data

US 2018/0162306 A1  Jun. 14, 2018

(30) Foreign Application Priority Data

Dec. 12, 2016  (JP) .................................. 2016-240447

(51) Int. Cl.
*B62D 25/08* (2006.01)
*B60R 19/48* (2006.01)
(Continued)

(52) U.S. Cl.
CPC .......... *B60R 19/483* (2013.01); *B60Q 1/0023* (2013.01); *B60R 19/50* (2013.01);
(Continued)

(58) Field of Classification Search
CPC . B60R 19/50; B60R 19/483; B60R 2019/505; B60R 2019/2019; B62D 25/08;
(Continued)

(56) References Cited

U.S. PATENT DOCUMENTS 9,828,036 B2 * 11/2017 Frayer .................. B62D 25/082
9,925,912 B2 *  3/2018 Zawacki .............. B60Q 1/0041
(Continued)

FOREIGN PATENT DOCUMENTS

DE         197 31 754 A1   2/1999
DE    10 2009 045860 A1   4/2010
(Continued)

OTHER PUBLICATIONS

May 2, 2018 Extended Search Report issued in European Patent Application No. 17206198.8.

*Primary Examiner* — Gregory A Blankenship
(74) *Attorney, Agent, or Firm* — Oliff PLC

(57) ABSTRACT

There is provided a mounting structure of a vehicle periphery monitoring device, the structure including (i) a front bumper reinforcement of a vehicle, (ii) a headlamp having a lamp housing, the headlamp being disposed further in a vehicle body upward direction than the front bumper reinforcement and at an outward end section in the vehicle width direction of the vehicle, (iii) a vehicle component disposed further in a vehicle body downward direction than the headlamp, and (iv) a vehicle periphery monitoring device disposed further in a vehicle body downward direction than a lower surface of the lamp housing, the vehicle periphery monitoring device separated by a first gap from an outward end surface in the vehicle width direction of the front bumper reinforcement, and being separated by a second gap from an upward end surface of the vehicle component.

2 Claims, 7 Drawing Sheets

(51) Int. Cl.
   *B60R 19/50* (2006.01)
   *B60Q 1/00* (2006.01)
   *G01S 13/93* (2006.01)
   *B60R 21/00* (2006.01)

(52) U.S. Cl.
   CPC . *B60R 2019/505* (2013.01); *B60R 2021/0053* (2013.01); *G01S 2013/9389* (2013.01)

(58) Field of Classification Search
   CPC ............... B62D 25/085; B60Q 1/0023; G01S 2013/9389; G01S 2013/9375
   See application file for complete search history.

(56) References Cited

U.S. PATENT DOCUMENTS

| | | | |
|---|---|---|---|
| 2004/0218042 A1* | 11/2004 | Kanada | B60R 1/00 348/148 |
| 2008/0158897 A1* | 7/2008 | Nakamura | B60Q 1/0023 362/487 |
| 2008/0180965 A1* | 7/2008 | Nakamura | B60Q 1/0023 362/507 |
| 2009/0001759 A1* | 1/2009 | Kondo | B60R 19/483 296/187.03 |
| 2010/0097264 A1 | 4/2010 | Kawasaki et al. | |
| 2010/0244487 A1 | 9/2010 | Gonin et al. | |
| 2011/0279304 A1 | 11/2011 | Yonemoto et al. | |
| 2014/0167454 A1* | 6/2014 | Clapie | B62D 25/085 296/203.02 |
| 2014/0354465 A1* | 12/2014 | Lee | G01S 17/936 342/70 |
| 2016/0023624 A1* | 1/2016 | Schaaf | B60R 19/03 293/117 |
| 2016/0137230 A1* | 5/2016 | Taneda | B62D 25/085 296/193.09 |
| 2016/0368367 A1* | 12/2016 | Schoning | B60R 19/48 |
| 2018/0162306 A1* | 6/2018 | Kaminade | B60Q 1/0023 |
| 2018/0208248 A1* | 7/2018 | Klop | B62D 21/155 |
| 2018/0304849 A1* | 10/2018 | Hashimoto | B60R 21/0136 |

FOREIGN PATENT DOCUMENTS

| | | |
|---|---|---|
| EP | 2006162 A1 | 12/2008 |
| EP | 2 233 367 A1 | 9/2010 |
| JP | 2007-106198 A | 4/2007 |
| JP | 2007-106199 A | 4/2007 |
| JP | 2010/066092 A | 3/2010 |
| JP | 2010-101643 A | 5/2010 |
| JP | 2010-135087 A | 6/2010 |
| JP | 2010-137758 A | 6/2010 |
| JP | 2010/204030 A | 9/2010 |
| JP | 2011-238470 A | 11/2011 |
| JP | 2013-001227 A | 1/2013 |
| KR | 10-2008-0008660 A | 1/2008 |

* cited by examiner

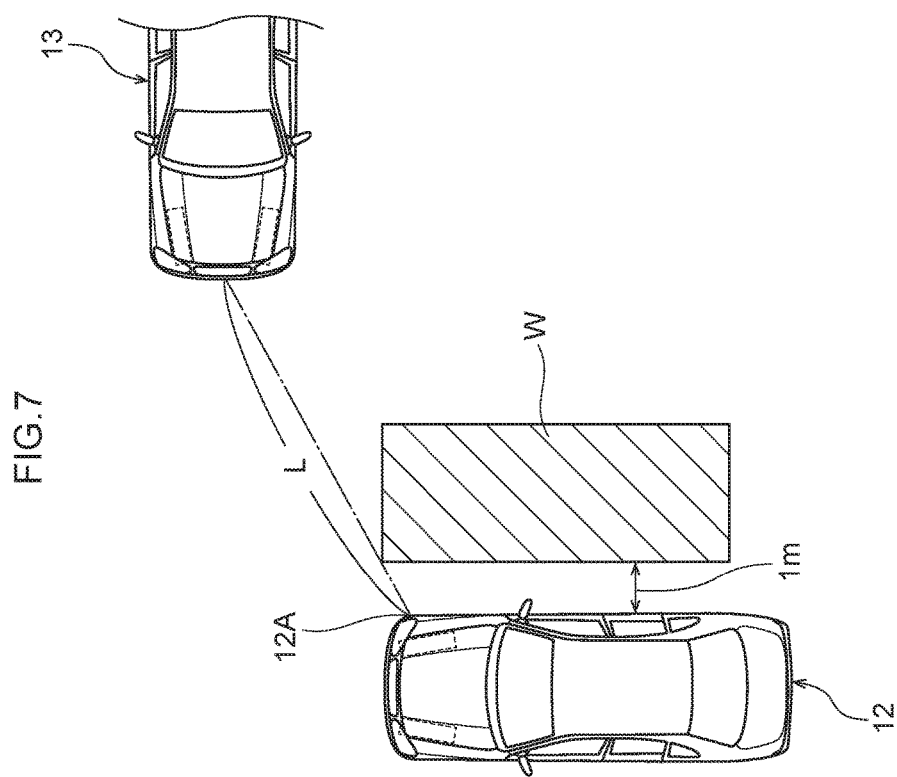

MOUNTING STRUCTURE OF VEHICLE PERIPHERY MONITORING DEVICE

CROSS-REFERENCE TO RELATED APPLICATION

This application claims priority under 35 USC 119 from Japanese Patent Application No. 2016-240447 filed on Dec. 12, 2016, the disclosure of which is incorporated by reference herein.

BACKGROUND

Technical Field

The present disclosure relates to a mounting structure of a vehicle periphery monitoring device.

Related Art

There is known from the past a configuration where, in order to reduce a load on a pedestrian received from a vehicle during a collision between the vehicle and the pedestrian, a sensor that detects an object of a vehicle periphery (a vehicle periphery monitoring device) is mounted not on a vehicle body skeletal member, but on an inner surface of a bumper cover or on a bumper retainer that are made of a resin. Reference should be made to, for example, Japanese Patent Application Laid-Open Publication No. 2007-106199.

However, in this kind of mounting structure, there is a possibility that, for example, even during a minor collision of the vehicle or during a collision on a region separated from the sensor, a misalignment ends up occurring in an installation state such as a position or angle of the sensor. Moreover, in this kind of mounting structure, in order to measure the likes of the position or angle of the sensor, it is required to configure at least a sensor peripheral section of the bumper cover as a detachable structure, and there is a possibility that design of the vehicle ends up being affected.

SUMMARY

The present disclosure obtains a mounting structure of a vehicle periphery monitoring device that can reduce a load on a pedestrian received from a vehicle during a collision between the vehicle and the pedestrian, and in which it is difficult for a misalignment to occur in a position or angle of the vehicle periphery monitoring device.

A first aspect of the present disclosure is a mounting structure of a vehicle periphery monitoring device, including (i) a front bumper reinforcement that extends along a vehicle width direction and is disposed in a frontward end section at a vehicle body of a vehicle, (ii) a headlamp having a lamp housing, a light source being housed in the lamp housing, the headlamp being disposed further in a vehicle body upward direction than the front bumper reinforcement and at an outward end section in the vehicle width direction of the vehicle, (iii) a vehicle component disposed further in a vehicle body downward direction than the headlamp, and (iv) a vehicle periphery monitoring device disposed further in a vehicle body downward direction than a lower surface of the lamp housing, the vehicle periphery monitoring device separated by a first gap in the vehicle width direction from an outward end surface in the vehicle width direction of the front bumper reinforcement, and being separated by a second gap in a vehicle body vertical direction from an upward end surface of the vehicle component, the vehicle periphery monitoring device detecting an object frontwards and outwards in the vehicle width direction of the vehicle.

Due to the above-described first aspect, a vehicle periphery monitoring device, that detects an object frontwards and outwards in a vehicle width direction of a vehicle, is disposed further in a vehicle body downward direction than a lower surface of a lamp housing and is separated by the first gap in the vehicle width direction from the outward end surface in the vehicle width direction of a front bumper reinforcement, and being separated by the second gap in a vehicle body vertical direction from the upward end surface of a vehicle component.

Therefore, even if the pedestrian collides with a front section of the vehicle, it is difficult for a reaction force from the vehicle periphery monitoring device to act on the pedestrian, and the load on the pedestrian received from the vehicle is reduced.

In addition, a second aspect of the present disclosure is the mounting structure of the vehicle periphery monitoring device according to the above-described first aspect, wherein an installation angle in planar view of the vehicle periphery monitoring device is assumed to be an angle at which a detecting region in which the object is detected does not interfere with a turning region of a front wheel.

Due to the above-described second aspect, an installation angle in planar view of the vehicle periphery monitoring device is assumed to be an angle at which a detecting region in which the object is detected does not interfere with the turning region of a front wheel. Therefore, it is prevented that the front wheel is misdetected as the object by the vehicle periphery monitoring device.

A third aspect of the present disclosure is the mounting structure of the vehicle periphery monitoring device according to the above-described first and second aspects, wherein the vehicle periphery monitoring device is attached to a bracket, the bracket suspends downwardly in the vehicle vertical direction from the lower surface of the lamp housing.

Due to the above-described third aspect, since the vehicle periphery monitoring device is attached to the bracket that suspends from the lower surface of the lamp housing, it is more difficult for a misalignment to occur in a position or angle of the vehicle periphery monitoring device, compared to in a configuration where the vehicle periphery monitoring device is provided on an inner surface of a bumper cover, for example.

Due to the first aspect, a load on a pedestrian received from a vehicle during a collision between the vehicle and the pedestrian can be reduced.

Due to the second aspect, it can be prevented that a front wheel is misdetected as an object by the vehicle periphery monitoring device.

Due to the third aspect, it can be made more difficult for a misalignment to occur in a position or angle of a vehicle periphery monitoring device.

BRIEF DESCRIPTION OF THE DRAWINGS

An exemplary embodiment of the present disclosure will be described in detail based on the following figures, wherein:

FIG. 7 is a plan view showing a state where the sensor of the vehicle including the mounting structure according to the present embodiment detects a crossing vehicle.

DETAILED DESCRIPTION

An embodiment according to the present disclosure will be described in detail below based on the drawings. Note that for convenience of explanation, an arrow UP, an arrow FR, and an arrow RH appropriately indicated in each of the drawings are assumed to be, respectively, a vehicle upward direction, a vehicle frontward direction, and a vehicle rightward direction. Moreover, in the description below, when directions of up/down, front/rear, and left/right are described, these are assumed to indicate up/down in a vehicle vertical direction, front/rear in a vehicle front-rear direction, and left/right in a vehicle left-right direction (vehicle width direction), unless otherwise specifically stated.

Figure 1:
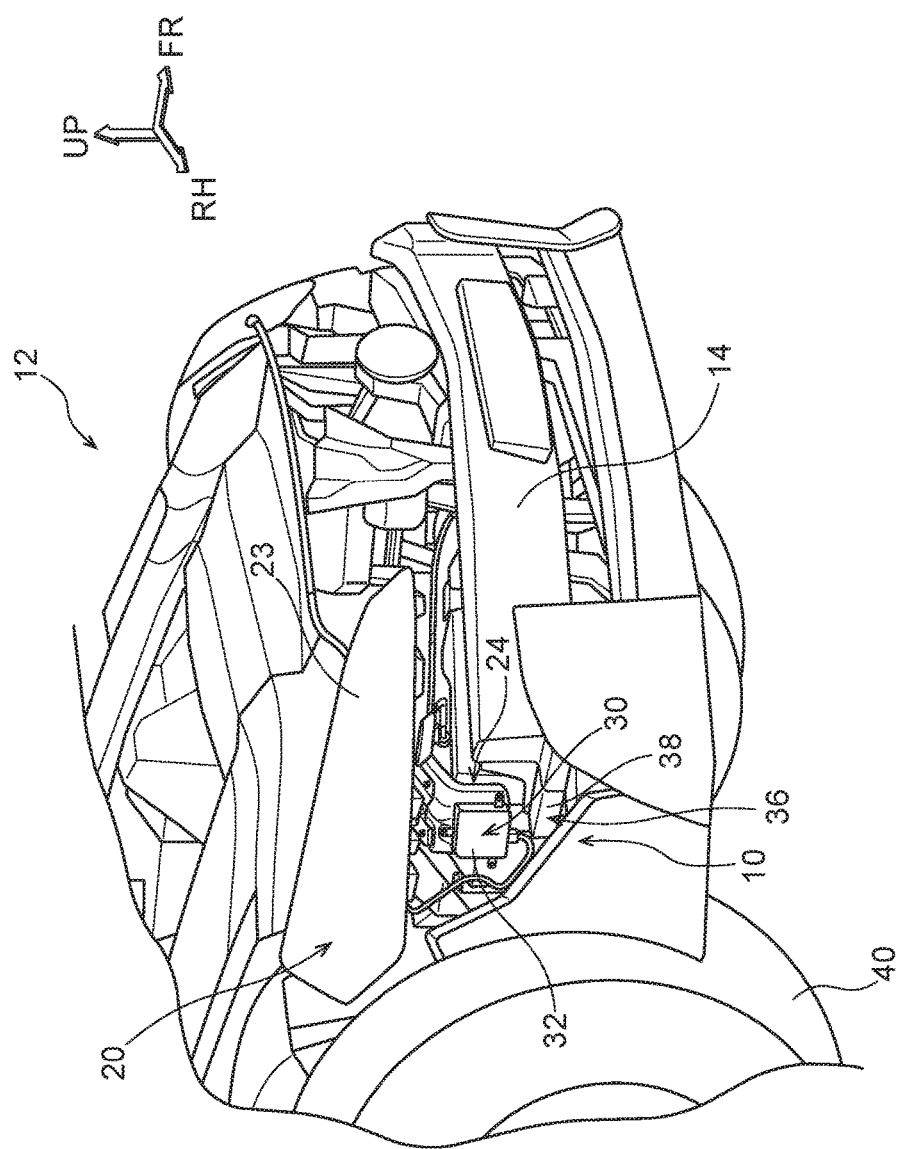
FIG. 1 is a perspective view showing a front section of a vehicle including a mounting structure according to the present embodiment.
Figure 2:
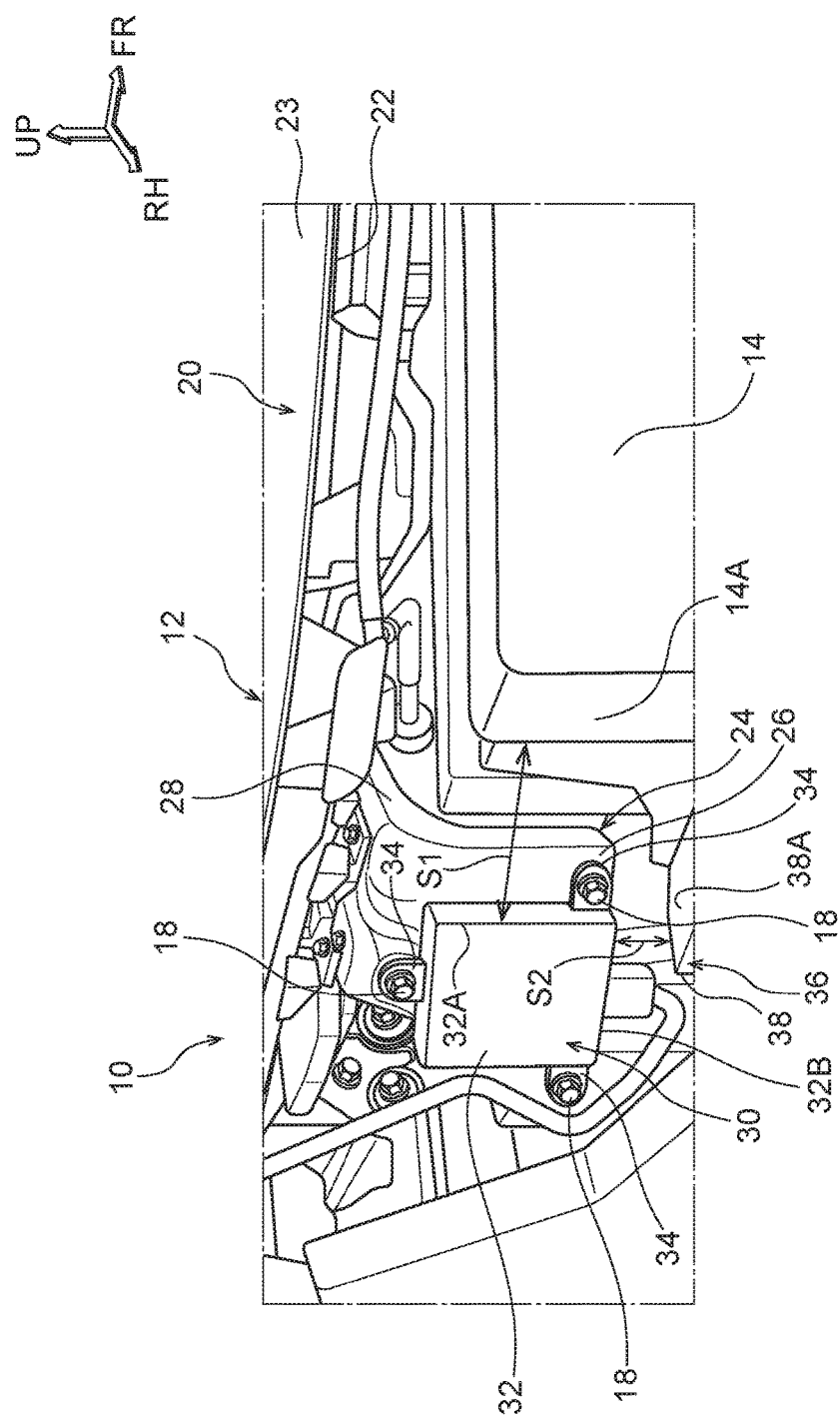
FIG. 2 is a perspective view showing enlarged the front section of the vehicle including the mounting structure according to the present embodiment.

As shown in FIGS. 1 and 2, a mounting structure 10 of a sensor 30 serving as a vehicle periphery monitoring device according to the present embodiment includes a front bumper reinforcement 14, made of a metal, which is extended in the vehicle width direction to be disposed in a frontward end section of a vehicle 12. The front bumper reinforcement 14 is installed, via a crash box 16 (refer to FIG. 5), in front end sections of a left/right pair of front side members (illustration of which is omitted), and is formed in a rectangular closed cross-sectional shape in a cross-sectional view orthogonal to the vehicle width direction.

Figure 3:
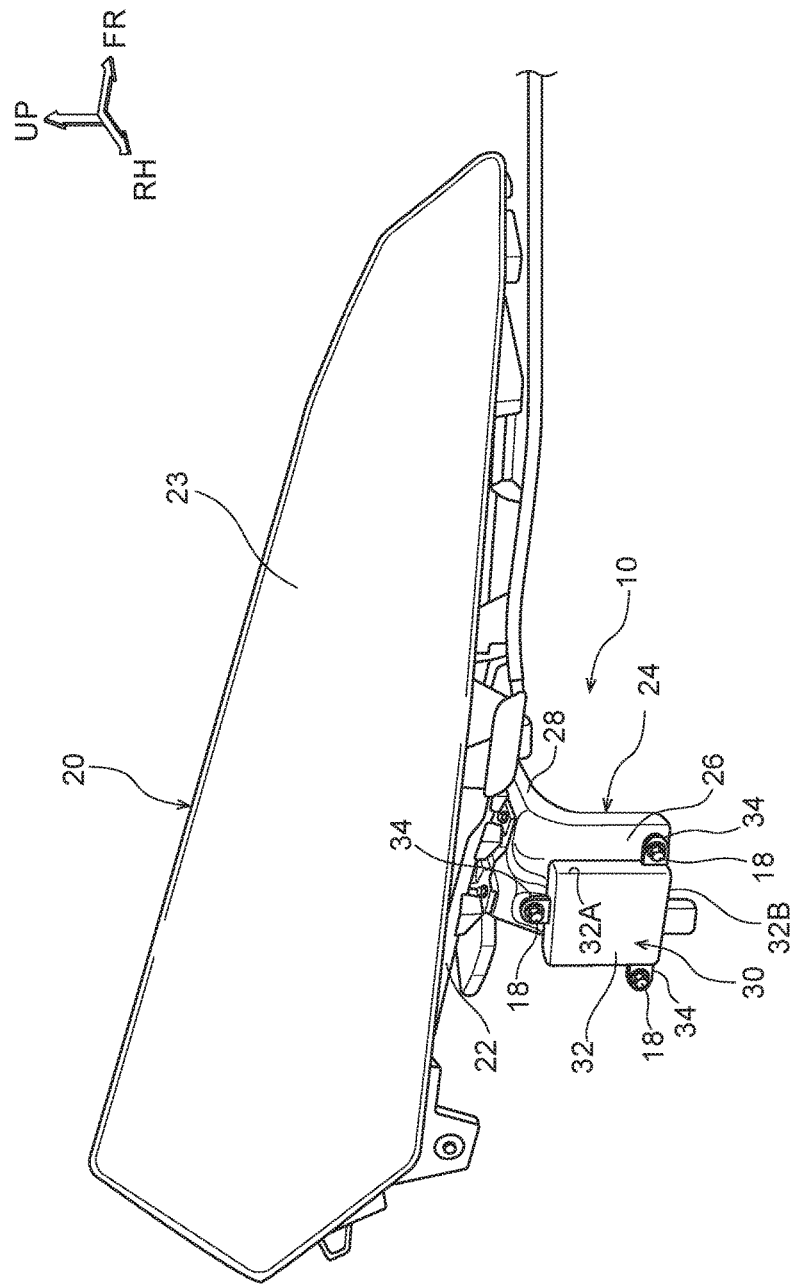
FIG. 3 is a perspective view showing a headlamp and a sensor configuring the mounting structure according to the present embodiment.
Figure 4:
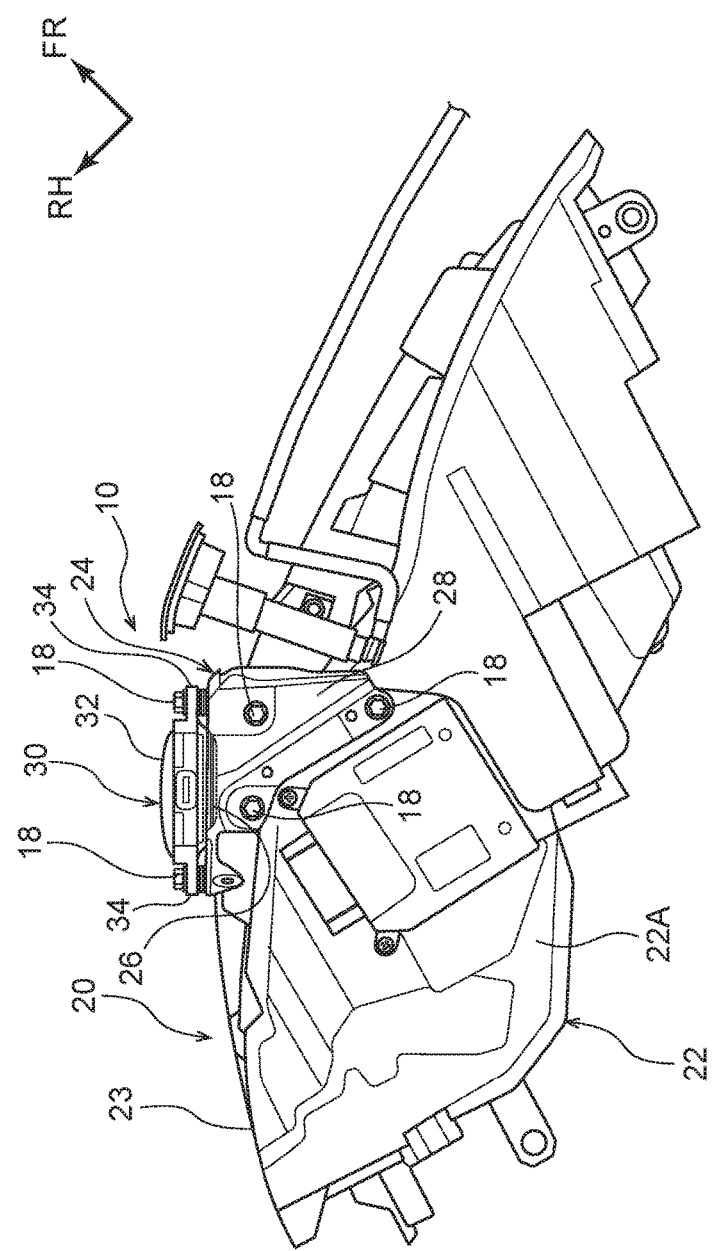
FIG. 4 is a bottom plan view showing the headlamp and the sensor configuring the mounting structure according to the present embodiment.

Moreover, the mounting structure 10 according to the present embodiment includes a headlamp 20 disposed further in a vehicle body upward direction than the front bumper reinforcement 14 and at an outward end section in the vehicle width direction of the vehicle 12. As shown in FIGS. 3 and 4, the headlamp 20 has a lamp housing 22 formed in a casing shape by a resin material, and an unillustrated light source, reflector, lens, and so on, are housed in the lamp housing 22.

In addition, the lamp housing 22 is hermetically sealed and has a waterproof property. Moreover, a front wall of the lamp housing 22 is configured as a transparent outer lens 23. A resin material resistant to damage such as cracking is adopted in the outer lens 23, and the outer lens 23 undergoes the likes of a surface treatment having an ultraviolet absorbing function (ultraviolet degradation resistance) or a surface treatment inhibiting scratching.

This outer lens 23 is configured so as to be exposed from a space surrounded by an unillustrated front bumper cover, front fender panel, and closed-state engine hood, and so as to transmit light that has been generated from the light source to be reflected by the reflector and made into a light beam by the lens. This results in a configuration whereby a certain region on a vehicle body frontward of the vehicle 12 is illuminated.

Figure 6:
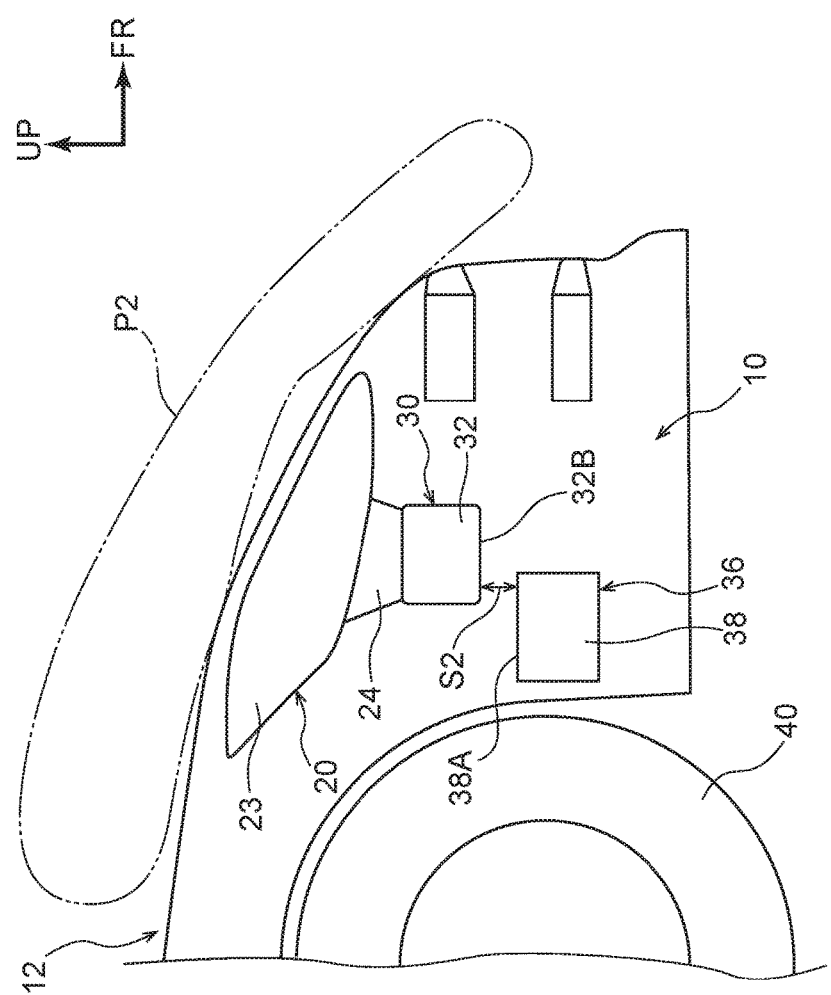
FIG. 6 is a side view showing schematically the mounting structure according to the present embodiment.

Moreover, as shown in FIGS. 1, 2, and 6, the mounting structure 10 according to the present embodiment includes a control device (ECU) 36, serving as a vehicle component, which is disposed further in a vehicle body downward direction than the headlamp 20 (sensor 30). The control device 36 is housed in a cover body 38, made of a resin, configured in a substantially rectangular box shape, and is electrically connected to the sensor 30, and so on. In other words, there is a configuration whereby information detected by the sensor 30 is transmitted to the control device 36.

Furthermore, as shown in FIGS. 1 to 6, the mounting structure 10 according to the present embodiment includes the sensor 30 having a radar function that detects an object more frontwards to an outer side in the vehicle width direction of the vehicle 12 than a turning region (shown by an imaginary line R in FIG. 5) of a front wheel 40. As shown in FIGS. 2 to 4, the sensor 30 is housed in a cover body 32, made of a resin, configured in a substantially rectangular box shape, and is provided vertically downwardly, via a bracket 24 made of a resin, on a lower surface of a lower wall 22A of the lamp housing 22.

Describing in detail, the bracket 24 has a flat plate shaped supporting wall 26 whose front surface is directed frontwards to an outer side in the vehicle width direction, and a plurality of (for example, three) through holes (illustration of which is omitted) are formed in certain places in an outer peripheral section of the supporting wall 26. Moreover, a total of three leg sections 34 protruding to a vehicle body upward and to an outward and an inward in the vehicle width direction are integrally formed in, respectively, an upper wall and both of left and right side walls of the cover body 32 housing the sensor 30, and through holes (illustration of which is omitted) are respectively formed in tips of each of the leg sections 34.

Therefore, the cover body 32 housing the sensor 30 is attached to the supporting wall 26 of the bracket 24 by being overlaid on the front surface of the supporting wall 26 such that each of the through holes of each of the leg sections 34 are communicated with each of the through holes of the supporting wall 26, and by a bolt 18 being inserted in each of the through holes from a vehicle body frontward to be screwed into a nut (illustration of which is omitted).

In addition, a flat plate section 28 configured in substantially a right angled triangular shape in bottom plan view shown in FIG. 4 is integrally formed continuously with the supporting wall 26, in an upper end section of the bracket 24. In other words, this bracket 24 is formed in substantially an inverted "L" shape in side view, and through holes (illustration of which is omitted) are respectively formed in each of apex portions (that is, three places) of the flat plate section 28. Moreover, a plurality of (three) through holes (illustration of which is omitted) corresponding to each of the through holes of the flat plate section 28 are formed in substantially a central portion in the vehicle width direction in the lower surface of the lower wall 22A of the lamp housing 22.

Therefore, the bracket 24 is attached to the lower surface of the lower wall 22A of the lamp housing 22 by being overlaid on substantially the central portion in the vehicle width direction in the lower surface of the lower wall 22A such that each of the through holes of the flat plate section 28 are communicated with each of the through holes of the lower wall 22A of the lamp housing 22, and by the bolt 18 being inserted in each of the through holes from a vehicle body downward side to be screwed into the nut (illustration of which is omitted).

This results in a configuration in which the sensor 30 (cover body 32) is provided vertically downwardly, via the bracket 24, on the lower surface of the lower wall 22A of the lamp housing 22, and is separated by a gap S1 (refer to FIGS. 2 and 5) in the vehicle width direction from an outward end surface 14A of the front bumper reinforcement 14, and is separated by a gap S2 (refer to FIGS. 2 and 6) in a vehicle body vertical direction from an upward end surface (hereafter, called "upper surface") 38A of the cover body 38 of the control device 36.

Note that a mounting position of the sensor 30, that is, a way of determining the gaps S1, S2, and so on, will be described in detail later. Moreover, a lower end section of the bracket 24 to which the sensor 30 (cover body 32) is attached is configured as a free end, and is configured to be not connected (not joined) to another vehicle component (illustration of which is omitted), or the like.

Figure 5:
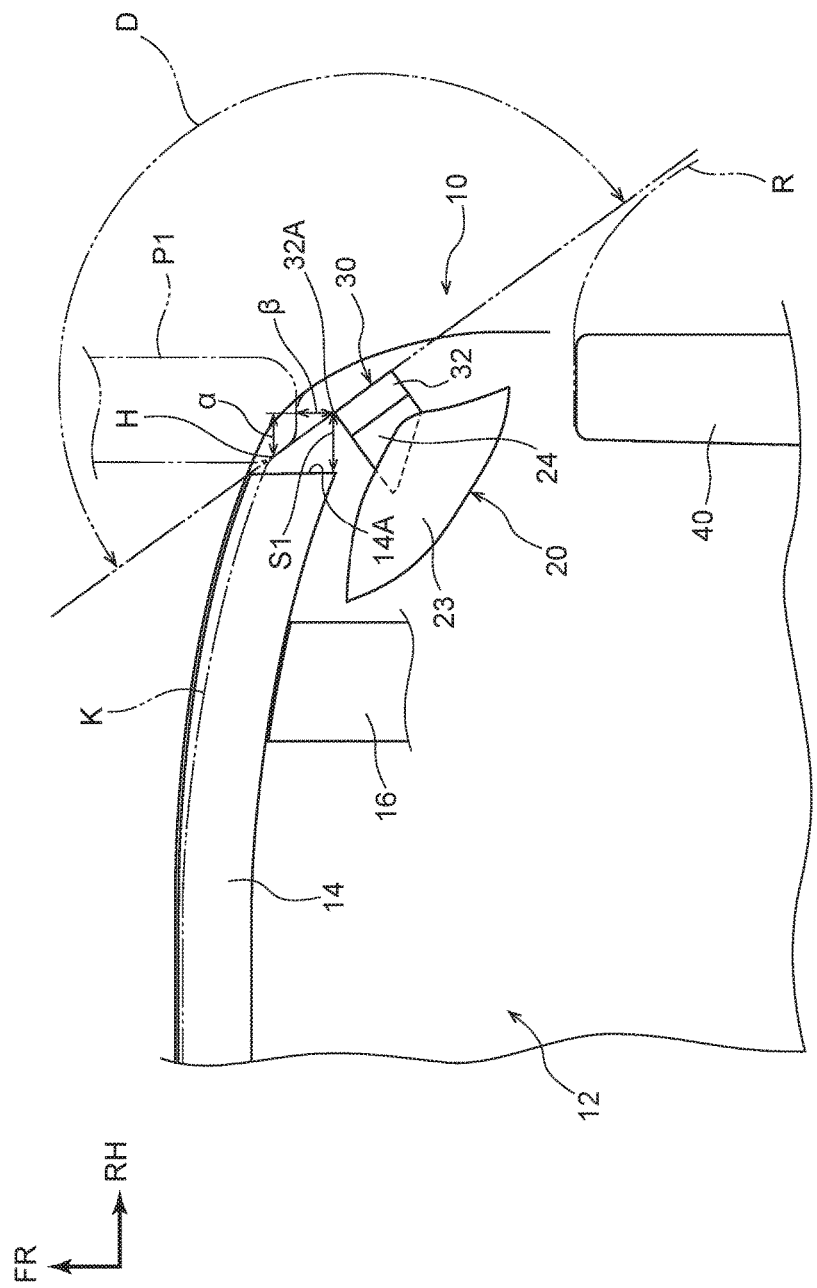
FIG. 5 is a plan view showing schematically the mounting structure according to the present embodiment.

In addition, as shown in FIG. 5, this sensor 30 is disposed obliquely to a vehicle body front-rear direction and the vehicle width direction (so as to be directed frontwards to an outer side in the vehicle width direction) in planar view, and its installation angle with respect to the vehicle body front-rear direction and the vehicle width direction in planar view is assumed to be an angle at which a detecting region (shown by an imaginary line D in FIG. 5) in which the object is detected does not interfere with (does not overlap) a turning region (imaginary line R) of the front wheel 40.

Moreover, this sensor 30 has a detecting region by which it is possible that, as shown in, for example, FIG. 7, in cases in which the vehicle 12 of oneself and a crossing vehicle 13 of another person mutually enter an intersection, specifically, in a case in which the crossing vehicle 13 approaches from a right side (or a left side) of the vehicle 12 driven by oneself, a front section of the crossing vehicle 13 separated by at least a distance L of 30 m from a vehicle width direction outer end section 12A of a front section of the vehicle 12 in planar view, is detected.

Note that this "distance L of 30 m" refers to a distance calculated from the fact that in order for the vehicle 12 to detect the crossing vehicle 13 two seconds before collision when a speed of the vehicle 12 is, for example, 30 km per hour to 60 km per hour which is a speed limit of a city area, the crossing vehicle 13 must be separated by 17 m to 33 m from the vehicle 12.

Now, the way of determining the mounting position (gaps S1, S2, and so on) of the sensor 30 provided vertically downwardly via the bracket 24 on the lamp housing 22, will be further described. This mounting position of the sensor 30 is determined based on a regulatory test. The "regulatory test" in the present embodiment refers to a test described in GTR (Global Technical Regulation) NO. 9 PEDESTRIAN SAFETY (Established in the Global Registry on 12 Nov. 2008).

First, a way of determining a position in the vehicle width direction (gap S1) and a position in the vehicle body front-rear direction with respect to the front bumper reinforcement 14 of the sensor 30, will be described. What is shown by an imaginary line P1 in FIG. 5 is a dummy member imitating a leg of a pedestrian. An entry position and an entry amount to a vehicle body rearward direction when the leg of the pedestrian has collided further outward in the vehicle width direction than an outward end section of the front bumper reinforcement 14, of an entry region of the pedestrian with respect to the vehicle 12 shown by an imaginary line K in FIG. 5, are obtained based on conditions of the above-described regulatory test for each vehicle type.

In the present embodiment, the mounting position of the sensor 30 is determined with reference to the entry position and the entry amount. Specifically, in order that, in planar view, a vehicle width direction inward front end section 32A of the cover body 32 of the sensor 30 will be further in the vehicle width outward direction to an extent of a certain gap α than the entry position with respect to the front section of the vehicle 12 of the leg of the pedestrian, that is, an actual strike-point position H, the inward front end section 32A of the sensor 30 is disposed in a position separated by the gap S1 (of not less than the gap α) from the vehicle width direction outward end surface 14A of the front bumper reinforcement 14, and is disposed in a position that is further in the vehicle body rearward direction to an extent of a certain gap β than the above-described entry amount. Note that the gaps α, β are assumed to be about 20 mm, for example.

Next, a way of determining a position in the vehicle body vertical direction (gap S2) of the sensor 30 will be described. What is shown by an imaginary line P2 in FIG. 6 is a dummy member imitating the pedestrian. In a case in which, as shown in FIG. 6, the pedestrian has collided with the vehicle 12 and the pedestrian has ridden up on an upper surface of the front section (engine hood or front fender panel) of the vehicle 12, the front section of the vehicle 12 is depressed in the vehicle body downward direction by a weight of the pedestrian, and a depression amount in the vehicle body downward direction is obtained based on conditions of the above-described regulatory test for each vehicle type.

In the present embodiment, the mounting position of the sensor 30 is determined with reference to the depression amount. Specifically, the sensor 30 has a lower surface 32B of its cover body 32 disposed further in the vehicle body upward direction than the upper surface 38A of the cover body 38 of the control device 36 to an extent of the gap S2 which is slightly larger than the above-described depression amount with respect to the front section of the vehicle 12 of the pedestrian. In other words, the control device 36 (cover body 38) is attached to the vehicle 12 such that the gap S2 separates the lower surface 32B of the cover body 32 from the upper surface 38A of the cover body 38.

Next, operations of the mounting structure 10 of the sensor 30 according to the present embodiment configured as above, will be described.

As described above, the sensor 30 is provided vertically downwardly, via the bracket 24, on the lower surface of the lower wall 22A of the lamp housing 22 configuring the headlamp 20. Moreover, this sensor 30 is disposed obliquely to the vehicle body front-rear direction and the vehicle width direction (so as to be directed frontwards to an outer side in the vehicle width direction) in planar view, and its installation angle is assumed to be an angle at which a detecting region (imaginary line D) in which the object is detected does not interfere with a turning region (imaginary line R) of the front wheel 40.

Therefore, it is prevented that the front wheel 40 adversely affects detection by the sensor 30. For example, it is prevented that the front wheel 40 is misdetected as the object by the sensor 30. In addition, as shown in FIG. 7, in the case of detecting the crossing vehicle 13 at an intersection, particularly, even in the case of an intersection where there is a shielding object such as a wall W in a position separated by 1 m in the vehicle width direction from the vehicle 12 and visibility is poor, the crossing vehicle 13 can be detected by the sensor 30. Moreover, even during running of the vehicle 12, an alongside vehicle that is running along a side of the vehicle 12 can be detected by this sensor 30, hence lane-changing, and so on, can be assisted.

Incidentally, a frontward sensor (illustration of which is omitted) being mounted close to a center in the vehicle width direction of the front section of the vehicle 12, to detect frontwards of the vehicle 12 driven by oneself, mainly a preceding vehicle, is known as prior art. However, if attempting to achieve more highly precise sensing in an automatic driving vehicle, mere detection of frontwards of the vehicle 12 could not be said to be sufficient.

In the present embodiment, the sensor 30 is provided so as to have a detecting region that does not interfere with the turning region of the front wheel 40, hence sides to both left and right from a central section in the vehicle width direction of the vehicle 12 and, furthermore, the crossing vehicle 13 or the alongside vehicle during lane-changing can be precisely detected. In other words, the present embodiment makes it possible to achieve more highly precise sensing in an automatic driving vehicle, and makes it possible to construct part of a preventive safety system capable of handling a variety of circumstances during running of the vehicle 12.

Moreover, as described above, the lower end section of the bracket 24 to which the sensor 30 (cover body 32) is attached is configured as a free end, and the lower surface 32B of the cover body 32 of the sensor 30 is disposed so as to be separated by the gap S2 in the vehicle body vertical direction from the upper surface 38A of the cover body 38 of the control device 36.

Therefore, even if the pedestrian collides with the front section of the vehicle 12 and, as shown in FIG. 6, the pedestrian rides up on the front section of the vehicle 12 whereby a headlamp 20 side moves (is depressed) in the vehicle body downward direction, the sensor 30 (cover body 32) can move in the vehicle body downward direction along with the bracket 24, hence a reaction force (load) is not exerted on the pedestrian by the sensor 30 (cover body 32). Hence, an injury value exerted on the pedestrian can be reduced.

In addition, as shown in FIG. 5, the sensor 30 has the vehicle width direction inward front end section 32A of its cover body 32 disposed so as to be separated by the gap S1 in the vehicle width direction from the vehicle width direction outward end surface 14A of the front bumper reinforcement 14. Moreover, in addition, this sensor 30 (cover body 32) is disposed further in the vehicle body rearward direction than the entry amount in the vehicle body rearward direction of the leg of the pedestrian obtained based on conditions of the above-described regulatory test.

Therefore, even if the leg of the pedestrian collides with the front section of the vehicle 12 further in in the vehicle width outward direction than an outward end section in the vehicle width direction of the front bumper reinforcement 14, it is suppressed or prevented that the leg of the pedestrian collides with the sensor 30 (cover body 32) via the front bumper cover. As a result, it can be suppressed or prevented that a reaction force (load) is exerted on the pedestrian by the sensor 30 (cover body 32), and the injury value exerted on the pedestrian can be reduced.

Moreover, the bracket 24 to which the sensor 30 (cover body 32) is attached and the lamp housing 22 are made of a resin, hence, even supposing the leg of the pedestrian collides with the sensor 30 (cover body 32) via the front bumper cover, the flat plate section 28 of the bracket 24 can be broken off (separated by splitting) from the lamp housing 22 due to input of a collision load. Hence, even in this case, it can be suppressed or prevented that a reaction force (load) is exerted on the pedestrian by the sensor 30 (cover body 32), and the injury value exerted on the pedestrian can be reduced.

In addition, this sensor 30 (cover body 32) is provided vertically downwardly on the lower surface of the lower wall 22A of the lamp housing 22 configuring the headlamp 20, and is not provided at an inner surface of the front bumper cover or at a front bumper retainer (illustration of which is omitted), hence even when, for example, an obstacle has collided with the front bumper cover in a relatively minor way, there is no risk of a position or angle of the sensor 30 misaligning (it is difficult for misalignment of a position or angle of the sensor 30 to occur).

Moreover, as shown in FIG. 1, because the sensor can be seen if the front bumper cover is removed (because it is possible to remove only the front bumper cover from the vehicle 12 in a state where the sensor 30 is mounted in the vehicle 12), there is no need to change a structure of the front bumper cover in order to measure an installation state (position or angle) of the sensor 30. In other words, the present embodiment makes it possible for the position or angle of the sensor 30 to be measured without affecting design of the vehicle 12.

The mounting structure 10 of the vehicle periphery monitoring device (sensor 30) according to the present embodiment has been described above based on the drawings. However, the mounting structure 10 of the vehicle periphery mounting device according to the present embodiment is not limited to what is illustrated in the drawings, and may have its design appropriately changed in a range not departing from the spirit of the present disclosure.

For example, the bracket 24 to which the sensor 30 (cover body 32) is attached is not limited to being made of a resin, and may be made of a metal such as sheet metal. Moreover, the vehicle component disposed more to the vehicle body downward side than the headlamp 20 (sensor 30) is not limited to the control device 36.

In addition, the sensor 30 may adopt a configuration in which the upper end section of the cover body 32 housing the sensor 30 is attached directly to the lower surface of the lower wall 22A of the lamp housing 22 configuring the headlamp 20, without mediation of the bracket 24. Moreover, a joining means of the sensor 30 (cover body 32) to the supporting wall 26 of the bracket 24 or a joining means of the bracket 24 (flat plate section 28) to the lower wall 22A of the lamp housing 22 are not limited to fastening by a bolt and a nut.

What is claimed is:

1. A mounting structure of a vehicle periphery monitoring device, comprising:
    a front bumper reinforcement that extends along a vehicle width direction and is disposed in a frontward end section at a vehicle body of a vehicle;
    a headlamp having a lamp housing, a light source being housed in the lamp housing, the headlamp being disposed further in a vehicle body upward direction than the front bumper reinforcement and at an outward end section in the vehicle width direction of the vehicle;
    a vehicle component disposed further in a vehicle body downward direction than the headlamp; and
    a vehicle periphery monitoring device disposed further in a vehicle body downward direction than a lower surface of the lamp housing, the vehicle periphery monitoring device being separated by a first gap in the vehicle width direction from an outward end surface in the vehicle width direction of the front bumper reinforcement, and being separated by a second gap in a vehicle body vertical direction from an upward end surface of the vehicle component, the vehicle periphery monitoring device detecting an object frontwards and outwards in the vehicle width direction of the vehicle,
wherein the vehicle periphery monitoring device is attached to a bracket, the bracket suspends downwardly in the vehicle body vertical direction from the lower surface of the lamp housing.

2. The mounting structure of the vehicle periphery monitoring device according to claim 1, wherein an installation angle in planar view of the vehicle periphery monitoring device is assumed to be an angle at which a detecting region in which the object is detected does not interfere with a turning region of a front wheel.

* * * * *